(12) United States Patent
Murray et al.

(10) Patent No.: US 6,302,940 B2
(45) Date of Patent: Oct. 16, 2001

(54) CHEMICAL SYNTHESIS OF MONODISPERSE AND MAGNETIC ALLOY NANOCRYSTAL CONTAINING THIN FILMS

(75) Inventors: Christopher Bruce Murray; Shouheng Sun, both of Ossining, NY (US); Dieter K. Weller, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/797,605

(22) Filed: Mar. 5, 2001

Related U.S. Application Data

(62) Division of application No. 09/359,638, filed on Jul. 26, 1999.

(51) Int. Cl.[7] ................................ B22F 9/00; B22F 1/00; C21B 15/04; C22B 5/20; B05D 5/12; B05D 7/00; H01F 1/00; H01F 1/44

(52) U.S. Cl. ................................ 75/348; 75/348; 75/362; 75/710; 427/128; 427/130; 427/132; 427/217; 427/374.1

(58) Field of Search ................................ 427/130, 132, 427/128, 217, 374.1; 75/343, 348, 362, 710

(56) References Cited

U.S. PATENT DOCUMENTS

| | | |
|---|---|---|
| 3,965,046 | 6/1976 | Deffeyes . |
| 4,940,596 | 7/1990 | Wright . |
| 5,240,493 | 8/1993 | Zhen et al. . |
| 5,698,483 | 12/1997 | Ong et al. . |
| 5,824,409 | 10/1998 | Sellmyer et al. . |
| 5,914,361 | 6/1999 | Inui et al. . |

FOREIGN PATENT DOCUMENTS 0 977 212-A2 * 2/2000 (EP) .

OTHER PUBLICATIONS

Li et al., "Magneti c Recording on Fe{t and FePtB Intermetallic Compound Media", IEEE Transactions on Magentics, Mar., 1999, vol. 35, No. 2, pp. 1077–1082.

Kuo et al., "Microstructure and Magnetic Properties of Fe100–xPtx Alloy Films", Journal of Applied Physics, Feb., 1999, vol. 85, No. 4, pp. 2264–2269.

Cebollada et al., "Enhanced Magneto–Optical Kerr Effect in Spontaneously Ordered FePt Alloys: Qunatative Agreement Between Theory and Experiment", Physical Review B, Aug., 1994, vol. 50, No. 5, pp. 3419–3422.

* cited by examiner

Primary Examiner—Roy King
Assistant Examiner—Harry D. Wilkins, III
(74) Attorney, Agent, or Firm—McGinn & Gibb, PLLC; Marian Underweiser, Esq.

(57) ABSTRACT

A method and structure for forming magnetic alloy nanoparticles includes forming a metal salt solution with a reducing agent and stabilizing ligands, introducing an organometallic compound into the metal salt solution to form a mixture, heating the mixture to a temperature between 260° and 300° C., and adding a flocculent to cause the magnetic alloy nanoparticles to precipitate out of the mixture without permanent agglomeration. The deposition of the alkane dispersion of FePt alloy particles, followed by the annealing results in the formation of a shiny FePt nanocrystalline thin film with coercivity ranging from 500 Oe to 6500 Oe.

13 Claims, 7 Drawing Sheets

CHEMICAL SYNTHESIS OF MONODISPERSE AND MAGNETIC ALLOY NANOCRYSTAL CONTAINING THIN FILMS

CROSS-REFERENCE TO RELATED APPLICATIONS

This application is a division of U.S. application Ser. No. 09/359,638 filed on Jul. 26, 1999.

BACKGROUND OF THE INVENTION

1. Field of the Invention

The present invention generally relates to convenient chemical syntheses of stable, nearly monodisperse alloy magnetic nanoparticles and an economic chemical approach to magnetic alloy nanocrystalline thin film production on a solid surface. The coercivity of the thin film can be controlled in the range between 500 Oe and 6500 Oe. This synthesis route offers a viable approach to the production of ultra-high density recording media.

2. Description of the Related Art

The storage density of commercial magnetic recording media is increasing at a compound rate of 60% per annum. As the storage density increases the individual storage bit size decreases proportionally. To control signal to noise ratios and other recording parameters, it is advantageous to maintain a large number of ferromagnetic grains per bit. Thus, the development of new magnetic media with smaller grains, high coercivity and high magnetization is required. Furthermore, to maximize the signal to noise ratio, the grains should be well isolated from each other to prevent exchange coupling between the grains, and possess a narrow size distribution. However, this scaling approach is limited by the onset of superparamagnetic behavior when the grain size falls below some material-dependent characteristic dimension.

One approach to reduce particle dimensions but still maintain sufficiently high coercivity is to take advantage of the high magnetocrystalline anisotropy found in some metal alloy systems. It is known that an assembly of very small non-interacting magnetic particles with high anisotropy possesses high coercivity. The coercivity arises because the small particles can support only a single domain state and irreversible magnetization rotation is the only possible mechanism of flux reversal.

The CoPt or FePt binary alloys are excellent candidates for this approach because of their chemical stability, and high magnetocrystalline anisotropy (thus high coercivity) arising from the existence of ordered intermetallic phases. For these alloys, magnetocrystalline anisotropies of around $7 \times 10e7$ erg/cm$^3$ have been obtained, compared to $5 \times 10e6$ erg/cm$^3$ for hcp cobalt-based recording media. Typical Co based recording media today have anisotropies of order $1-2 \times 10e6$ erg/cm$^3$. Since the stored magnetic energy scales with the anisotropy constant and the particle volume, KV, smaller particles of high K materials like FePt and CoPt can potentially be used in future media applications. The advantage is narrower transitions and reduced read back noise. Hcp cobalt based granular thin films doped with Pt are being used today in ultra-high density recording applications, a typical composition being $CoP_{10}Cr_{22}B_6$. Accordingly, tremendous research efforts have been focused on synthesis and characterization of near equiatomic CoPt and FePt alloys. These alloys may also have great potential for use as magnetic bias films of magneto-resistive elements, and magnetic tips for magnetic force microscopy.

A common procedure leading to CoPt or FePt alloy materials is co-sputtering of Co (or Fe) and Pt. This procedure allows little control over particle size or size distribution. The following description discloses that stable, monodisperse magnetic alloy nanoparticles and related nanocrystalline thin film can be easily synthesized by convenient chemical procedures.

The invention includes a convenient chemical way to prepare stable monodisperse Fe/Pt alloy magnetic nanoscale materials, an approach to form smooth nanocrystalline films on a variety of substrates, and exploring the possibility of using the developed materials as ultra-high density recording media.

SUMMARY OF THE INVENTION

The principal object of synthesizing magnetic Fe/Pt alloy nanoparticles and nanocrystalline thin films has been achieved in this invention. A combination of reduction of metal salt and decomposition of neutral organometallic precursor has been developed for the formation of the magnetic alloy nanoparticles. For example, in situ reduction of Pt(acac)$_2$ (acac=acetylactonate, $CH_3COCHCOCH_3$ anion) by long chain diol and decomposition of Fe(CO)$_5$ at a high temperature (260° C.–300° C.) solution phase yields high quality nanoparticles.

The particles are protected from agglomeration by a combination of long chain carboxylic acid, such as oleic acid, and long chain primary amine, such as oleyl amine. This stabilization is so effective that the particles can be handled easily either in solution phase or as solid form under air.

The particles are easily dispersed in alkane and chlorinated solvent and purified by precipitation through the addition of alcohol. Deposition of the alkane solution of the alloy particles on SiO$_2$, Si, Si$_3$N$_4$, or glass leads to the formation of a smooth particulate thin film, offering an economic route for the production of thin film media. The as-synthesized magnetic alloy shows a single-phase FCC and is magnetically soft. Under thermal conditions in the range of 500° C. to 650° C., the precipitated particles undergo long-range ordering to a structure of the CuAu-I type. This structure is tetragonal with the (002) planes, normal to the c axis, occupied alternately by Fe and Pt atoms, giving high magnetocrystalline anisotropy at room temperature. Coercivities between 500 Oe to 6500 Oe have been achieved at room temperature.

It is, therefore, an object of the present invention to provide a structure and method forming magnetic alloy nanoparticles, which includes forming a metal salt solution with a reducing agent and stabilizing ligands, introducing an organometallic compound into the metal salt solution to form a mixture, heating the mixture to a temperature between 260° and 300° C., and adding a flocculent to cause the magnetic alloy nanoparticles to precipitate out of the mixture without permanent agglomeration. The organometallic compound includes a solvent including one of phenyl ether and dioctyl ether. The reducing agent includes a long chain diol, which includes one of 1,2-hexadecanediol, 1,2-dodecanediol and 1,2-octanediol. The stabilizing ligands include RCOOH and RNH$_2$, where R includes an alkyl, alkenyl hydrocarbon chain (C6 or longer). The flocculent includes an alcohol including one of methanol, ethanol, propanol and butanol. The metal salt includes one of Pt salt, Pt(CH$_3$COCHCOCH$_3$)$_2$, Pt(CF$_3$COCHCOCF$_3$)$_2$, Tetrakis (triphenylphosphine) Platinum(O), or Pt(O) (triphenylphosphine)$_{4-x}$(CO)$_x$ where x is at least 1 and no greater than 3. The organometallic compound includes one of $Fe(CO)_5$, $Co_2(CO)_8$, $Co_4(CO)_{12}$, $Fe_2(CO)_9$, $Fe_3(CO)_{12}$, $Fe(CNR)_5$, and (Diene) $Fe(CO)_5$ (e.g., Cyclopentadiene, Cyclooctadiene, etc.).

Another embodiment of the invention is a method of forming a magnetic alloy nanoparticle film, which includes forming a metal salt solution with a reducing agent and stabilizing ligands, introducing an organometallic compound into the metal salt solution to form a mixture, heating the mixture to a temperature between 260° and 300° C., adding a flocculent to cause the magnetic alloy nanoparticles to produce a precipitate out of the mixture without permanent agglomeration, forming a dispersion with the precipitate, depositing the dispersion on a solid surface, annealing the dispersion in an inert atmosphere at temperature up to 650° C., and cooling the dispersion under an inert atmosphere. The dispersion includes either an alkane dispersion, including pentane, hexane, heptane, octane and dodecane, a chlorinated solvent dispersion, including dichloromethane and chloroform, or an aromatic solvent dispersion, including benzene, toluene and xylene. The dispersion includes an alkane $RNH_2$ (where R includes an alkyl or alkenyl chain of C12 or longer) formed by the addition of alcohol. The inert atmosphere includes one of $N_2$ or Ar. The annealing temperature is between 400° C. and 650° C. The annealing forms a layer of amorphous carbon around particles in the precipitate. The organometallic compound includes a solvent including one of phenyl ether and dioctyl ether. The reducing agent includes a long chain diol, which includes one of 1,2-hexadecanediol, 1,2-dodecanediol and 1,2-octanediol. The stabilizing ligands include RCOOH and $RNH_2$, where R includes an alkyl, alkenyl hydrocarbon chain (C6 or longer). The flocculent includes an alcohol including one of methanol, ethanol, propanol and butanol. The metal salt includes one of Pt salt, $Pt(CH_3COCHCOCH_3)_2$, $Pt(CF_3COCHCOCF_3)_2$, Tetrakis (triphenylphosphine), Platinum(O), or $Pt(O)(triphenylphosphine)_{4-x}(CO)_x$. The organometallic compound includes one of $Fe(CO)_5$, $Co_2(CO)_8$, $Co_4(CO)_{12}$, $Fe_2(CO)_9$, $Fe_3(CO)_{12}$, $Fe(CNR)_5$, and (Diene) $Fe(CO)_5$ (e.g., Cyclopentadiene, Cyclooctadiene, etc.).

Yet another embodiment is a method of forming a magnetic storage device having magnetic alloy nanoparticles, which includes forming a metal salt solution with a reducing agent and stabilizing ligands, introducing an organometallic compound into the metal salt solution to form a mixture, heating the mixture to a temperature between 260° and 300° C., and adding a flocculent to cause the magnetic alloy nanoparticles to precipitate out of the mixture without permanent agglomeration. The organometallic compound includes a solvent including one of phenyl ether and dioctyl ether. The reducing agent includes a long chain diol, which includes one of 1,2-hexadecanediol, 1,2-dodecanediol and 1,2-octanediol. The stabilizing ligands include RCOOH and $RNH_2$, where R includes an alkyl, alkenyl hydrocarbon chain (C6 or longer). The flocculent includes an alcohol including one of methanol, ethanol, propanol and butanol. The metal salt includes one of Pt salt, $Pt(CH_3COCHCOCH_3)_2$, $Pt(CF_3COCHCOCF_3)_2$, Tetrakis (triphenylphosphine), Platinum(O), or $Pt(O)(triphenylphosphine)_{4-x}(CO)_x$. The organometallic compound includes one of $Fe(CO)_5$, $Co_2(CO)_8$, $Co_4(CO)_{12}$, $Fe_2(CO)_9$, $Fe_3(CO)_{12}$, $Fe(CNR)_5$, and (Diene) $Fe(CO)_5$ (e.g., Cyclopentadiene, Cyclooctadiene, etc.).

The invention's synthetic method leads to nearly monodisperse particle thin films with controllable coercivity, providing a viable approach to such ultra-high density recording media.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
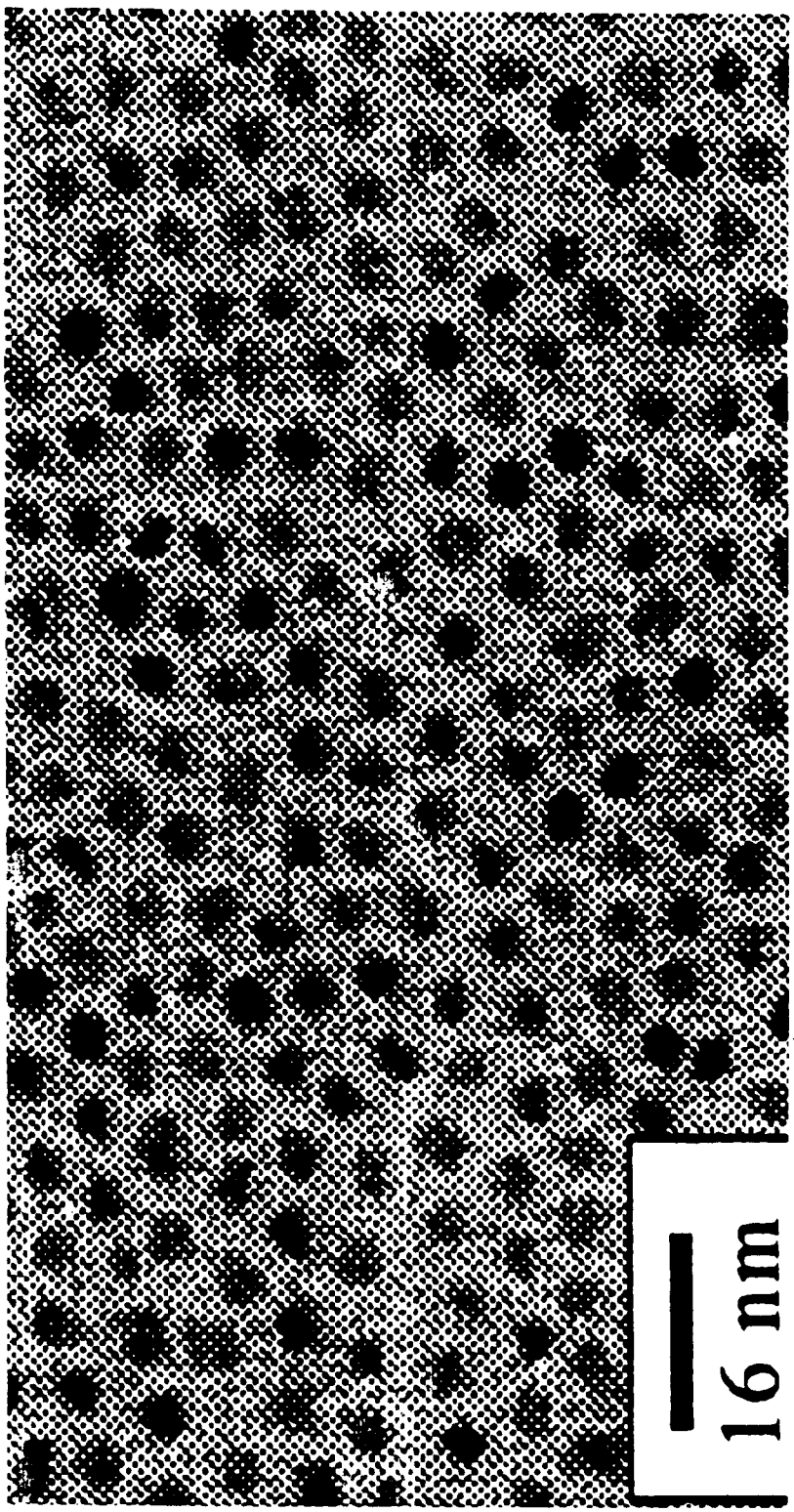
FIG. 1 shows a TEM image of as-synthesized FePt alloy particles where the sample was deposited on SiO-coated copper grid from its hexane dispersion and the particles are nearly monodisperse.

Long chain diols such as 1,2-octanediol, 1,2-dodecanediol and 1,2-hexadecanediol, etc. have been used previously to reduce metal salts (such as Pt salt, $Fe(OCOCH_3)_2$, $Fe(CH_3COCHCOCH_3)_2$, $Co(OCOCH_3)_2$, $Co(CH_3COCHCOCH_3)_2$, etc.) to metal nanoparticles, (e.g., see Murray et al., co-pending U.S. patent application Ser. No. 09/127,005, which is fully incorporated herein by reference). Thermal decomposition of an organometallic compound (such as $Fe(CO)_5$, $Co_2(CO)_8$, $Fe_2(CO)_8$, $[C_5H_5Fe(CO)_2]_2$, and $(C_5H_5)_2Fe$) is a known procedure to separate the Fe and its oxide particles (e.g., M. O. Bentzon, et al., Phil. Mag. B., 1989, V. 60(2), 169, fully incorporated herein by reference). The invention combines these two chemical reactions (e.g., the reduction of the metal salt and the decomposition of the organometallic compound) in situ to form magnetic alloy particles that have a very controlled grain size and are nearly monodisperse.

In our synthetic conditions, the reduction of the metal salt (e.g., $Pt(acac)_2$) by diol and the decomposition of the organometallic compound (e.g., $Fe(CO)_5$) do not occur until the temperature is greater than 180° C. These slow reduction and decomposition processes are useful in forming the high quality magnetic alloy particles.

More specifically, the invention forms such high quality magnetic alloy particles by mixing metal salt, diol, stabilizing ligands, organometallic compound and solvent under an inert atmosphere. The mixture is then heated to reflux. The reduction of the metal salt and the decomposition of the organometallic compound lead to homogeneous nucleation for the formation of the magnetic alloy particles. The growth of the magnetic alloy particles is completed in about 30 minutes. The hot black product dispersion is cooled to room temperature. A flocculent (e.g., alcohol, methanol, ethanol, propanol, ethylene, glycol, etc.) is added to precipitate the product. Indeed, the magnetic alloy particles precipitated out are nearly monodisperse.

The supernatant is discarded and the precipitated magnetic alloy particles are dispersed, in alkane solvent in the presence of oleic acid and amine. The dispersion can include an alkane dispersion, such as pentane, hexane, heptane, octane or dodecane; a chlorinated solvent dispersion, such as dichloromethane or chloroform; or an aromatic solvent dispersion, including benzene, toluene or xylene. Any unsolved impurity can be removed by centrifugation of the hexane dispersion. Purification of the crude product is performed by adding ethanol to the hexane dispersion of the particles, providing nearly monodisperse magnetic alloy nanoparticles which can be easily redispersed in an alkane solvent.

Oleic acid is preferred as a stabilizing ligand in the above process because it is known to stabilize cobalt and iron nanoparticles. Long aliphatic chains of oleic acid present a significant steric barrier for strong interactions between the particles, and magnetic exchange coupling between the particles is eliminated completely by the physical separation induced. Similar long chain carboxylic acids such as erucic acid and linoleic acid can also be used instead of oleic acid. Oleic acid is preferred because it is readily available.

Further, amine-based or other similar ligands, such as $RNH_2 (R>C_{12}H_{25}) R_2NH$ when $R=C_1$ to $C_{22}$, are included in a preferred embodiment to protect platinum particles. In the invention, long chain primary amine, such as oleyl amine, or alkyl amine $RNH_2$ with $R>C_{12}H_{25}$, etc., is used to protect the surface Pt component of the magnetic alloy particles. The combination of acid/amine provides good control over the magnetic alloy particles' growth and stabilization.

Phenylether or n-dioctylether is preferably used as the solvent. However, as would be known by one ordinarily skilled in the art given this disclosure, any suitable solvent with high boiling point and good solubility of Fe and Pt compounds could be used. Other solvents include mineral oil, paraffin wax and polyethylene glycol. The reaction can be carried out at temperatures ranging from 260° C. to 300° C. depending on the solvent used.

Referring now to the drawings, one example of the invention which forms FePt nanoparticles using the above process is illustrated. More specifically, in this example, Pt salt, diol, stabilizing ligands, $Fe(CO)_5$ and solvent are combined under an inert atmosphere. The mixture is then heated to between 260° C. and 300° C. for 30 minutes and allowed to cool to room temperature. Alcohol is added to precipitate the FePt nanoparticles.

In FIG. 1, the particle size and distribution are determined by TEM image analysis. To produce the image shown in FIG. 1, carbon- or SiO-coated copper grids were dipped into the hexane solution of the FePt nanoparticles and dried at room temperature. The TEM image (from Philips EM 420, 120 KV) in FIG. 1 shows that the FePt nanoparticles have an average diameter of 4 nm. The FePt nanoparticles are uniformly dispersed in the film and have a narrow size distribution.

The magnetic alloy particles can be processed into well formed particle thin films. As mentioned above, the magnetic alloy particles are well isolated from each other by the protecting ligands. Oleic acid and oleylamine ligands around the particles can be replaced by other aliphatic acids and primary amines. Thus, purification by adding ethanol to hexane dispersion in the presence of 1-octadecylamine, leads to octadecylamine and oleic acid protected magnetic alloy particles.

Depositing the hexane dispersion of magnetic alloy particles on a flat substrate, such as $SiO_2$, Si, glass, or carbon and drying the same at room temperature leads to well formed particle thin films. Magnetic measurements of FePt films shows that the magnetic alloy films are magnetically soft with no coercivity at room temperature. Annealing the magnetic alloy films at temperatures between 500° C. and 650° C. produces mirror-like thin films with controlled coercivities between 500 Oe and 6500 Oe.

Figure 2:
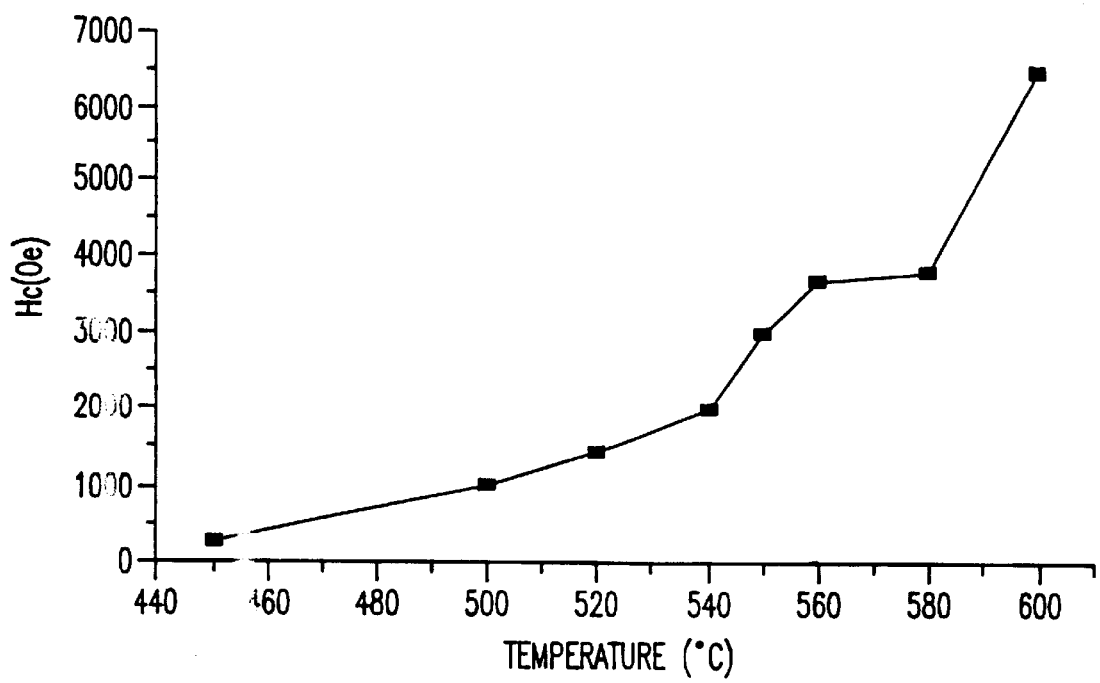
FIG. 2 shows the coercivity change of one set of samples (48% at. Pt) as a function of annealing temperature after annealing for 30 min. where coercivity data were collected on 9500 Vibrating Sample Magnetometer at room temperature with thin film paralleling to magnetic field.

Using the same FePt example as discussed above with respect to FIG. 1, a typical annealing temperature dependent Hc is shown in FIG. 2. The hard magnetic behavior of a FePt alloy is related to the crystalline phase transition. The inventive magnetic alloy usually has a disordered fcc structure which transforms into an ordered fct structure with $c/a=0.98$ after annealing. This crystalline phase change in the film can be easily detected by X-ray diffraction.

Figure 3:
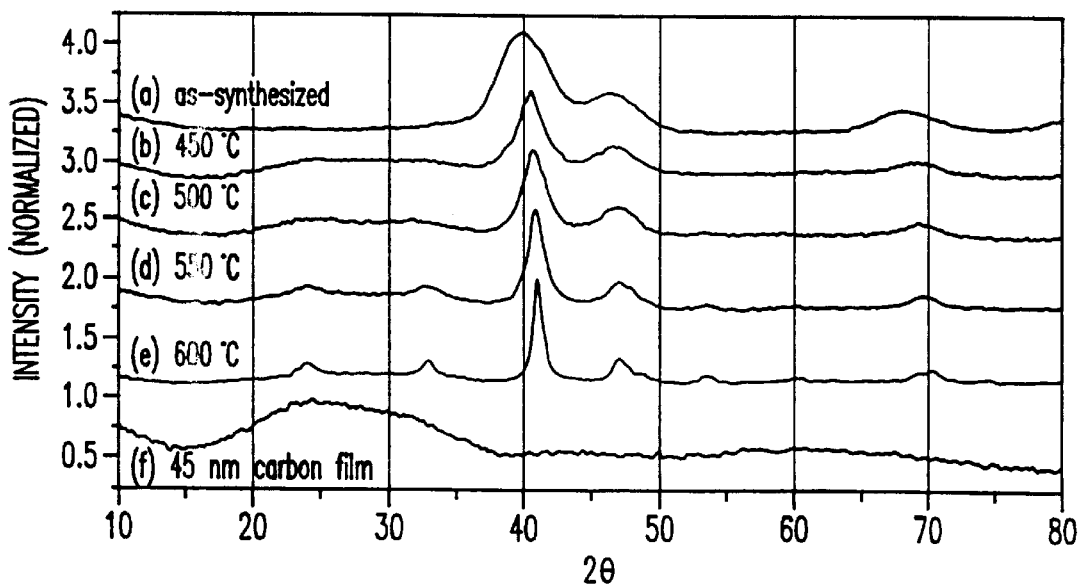
FIG. 3 shows the X-ray diffraction patterns of (a) as-synthesized FePt particles, (b)–(e) the thin film formed after annealing for 30 minutes under $N_2$ and (f) 45 nm amorphous carbon thin film where the samples were deposited on glass substrate and the diffraction pattern was collected on a Siemens D-S00 diffractometer with Cu K(alpha) radiation (lamda=1.54056 Å)

The predominant features in the XRD pattern of the exemplary FePt particle thin film are characteristic of a disordered fcc structure, as shown in FIG. 3(a). Annealing to higher temperatures leads to pronounced structure changes. FIG. 3(b)–(e) show a series of diffraction patterns at different annealing temperatures. These demonstrates that, with respect to the FePt example being discussed, the crystal phase change for FePt (at 48% Pt) particles occurs at about 450° C. and is complete at around 580° C.

During the alloying phase change, in the FePt example being discussed, the particle diameter remained about constant at approximately 4 nm, as confirmed by both TEM and high resolution SEM analyses. The strong peaks that appear at 2 φ°=24, 33, 41, 47, and 70 correspond to reported (JCODS) tetragonal FePt crystal phase with a=3.8525 angstrom and c=3.7133 angstrom.

Further, annealing at high temperatures (greater than 500° C.) under $N_2$ did not result in the loss of the stabilizing ligand. Rather, the stabilizing ligand decomposed to give amorphous carbon that covered around the particles. The bumps in FIG. 3(b)–(e) are due to the existence of such amorphous carbon. This can be easily verified by comparing figures (b)–(e) with the X-ray diffraction pattern of 45 nm amorphous carbon film on a glass substrate shown in FIG. 3(f).

This carbon coated FePt nanocrystalline thin film is very stable towards oxidation. Experimentally exposing the annealed FePt samples to the ambient environment did not result in the formation of layers of oxides, as confirmed by X-ray analysis. However, it should be mentioned that $N_2$ purity is important for successful alloy phase change during the annealing. The above annealing experiment was performed in a $N_2$ Box with $O_2$ content lower than 10 ppm. Otherwise, oxides formation was observed.

Figure 4:
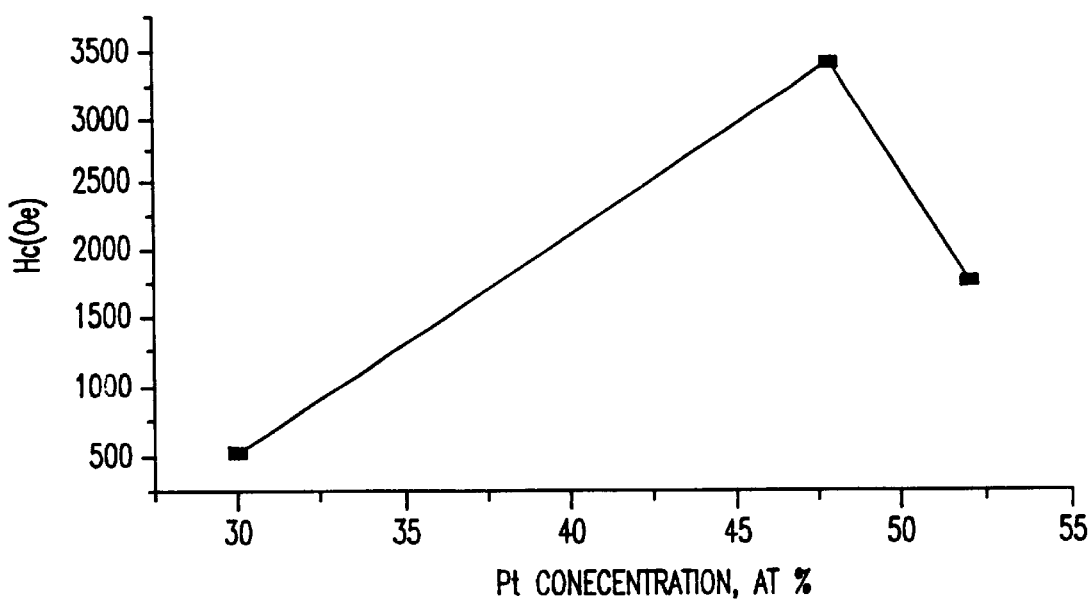
FIG. 4 shows the coercivity change of thin film with various Pt concentration where the film was annealed at 600° C. under $N_2$ for 30 minutes.

The component of FePt particle materials has been studied either by ICP-Atomic Emission Spectrometer for as-synthesized particles or by Rutherford Backscattering for the thin film. The FePt ratio can be readily controlled by changing the ratio of starting molecules of $Fe(CO)_5$ and $Pt(acac)_2$ from 40% at. Pt to about 20% at. Pt. However, magnetic measurements show that the film containing a little Fe rich component gives high coercivity, as shown in FIG. 4.

Figure 5:
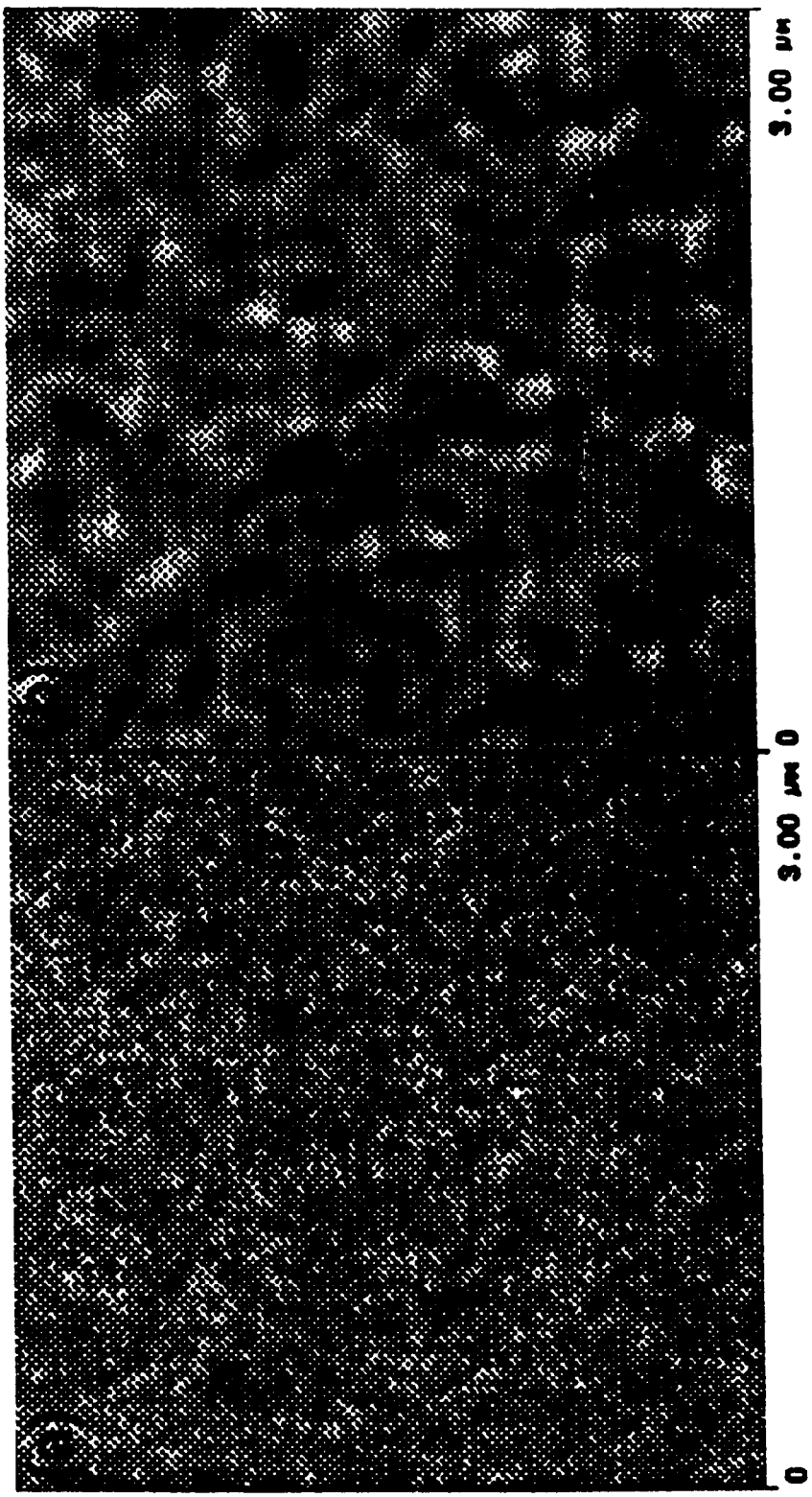
FIG. 5 shows (a) an atomic force microscopy image of the topography of a FePt sample annealed to 600° C. and (b) a magnetic force microscopy image of the same area of the sample in which the as-deposited magnetic domain structure is evident where the topography of the sample has a z-range of 9.3 nm over this 3 $\mu$m region, and RMS roughness of 0.999 nm and the magnetic structure shows a fairly broad length scale distribution, as taken from a 2D power spectral density calculation, which peaks at 188 nm.
Figure 6A:
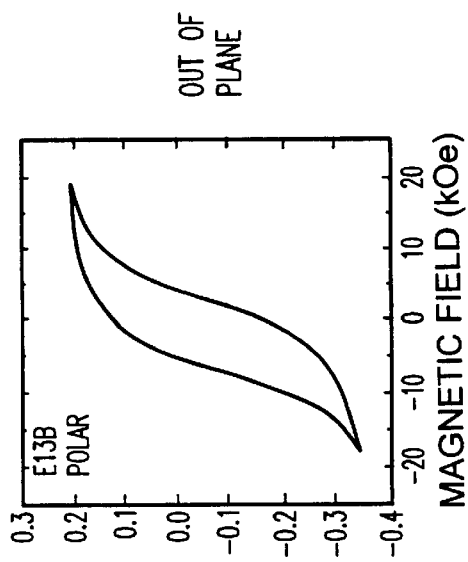
FIGS. 6a and 6b show in plane and out of plane coercivities of 3 FePt nanoparticle samples measured with a Kerr magnetometer where coercivities of 1800 Oe, 2000 Oe and 5000 Oe for the three different annealing conditions indicated at the top of the figure are found and there is little difference between in-plane and out-of-plane coercivities, indicating 3D-random orientation of the magnetic axes.
Figure 6A:
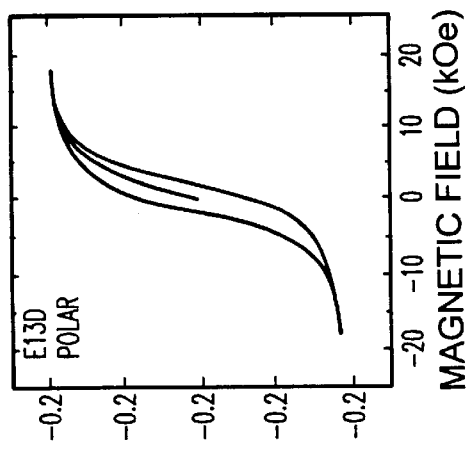
Figure 6A:
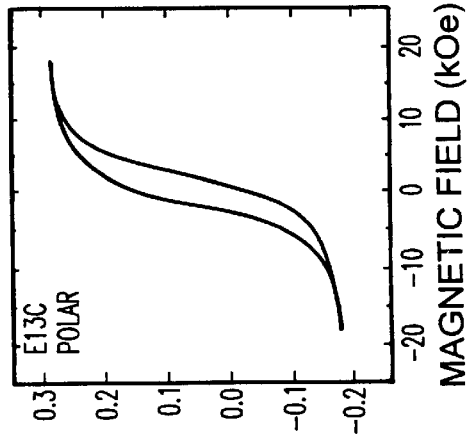
Figure 6B:
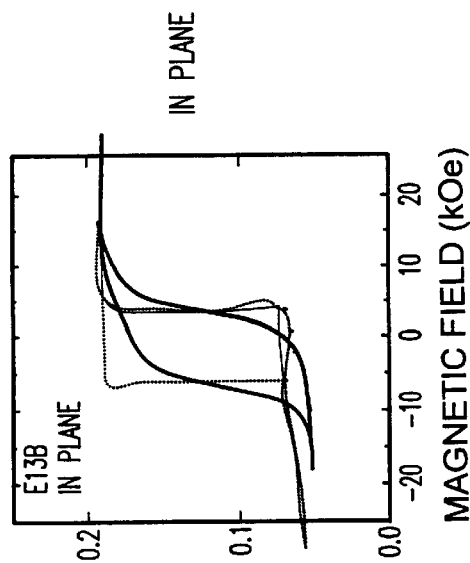
Figure 6B:
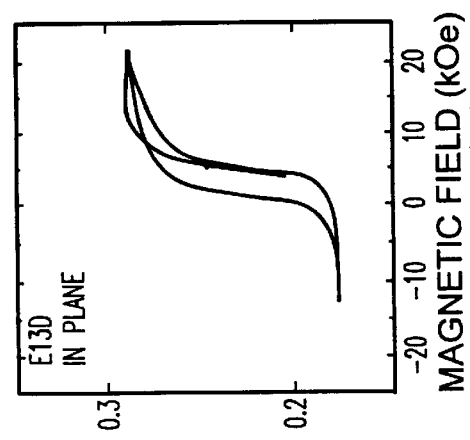
Figure 6B:
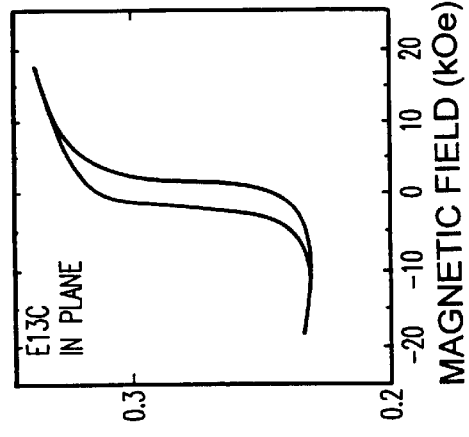

The roughness of the deposited films in this example has been investigated by atomic force microscopy (AFM), as shown in FIG. 5(a), and RMS roughness values of approximately 1 nm have been achieved over areas of 3×3 $\mu$m. The magnetic domain structures which evolve in the as-deposited films have been investigated by magnetic force microscopy (MFM) and it has been found that there is a stable magnetic domain structure with length scales on the order of hundreds of nanometers, as shown in FIG. 5(b). This long range ordering is attributed to the dipolar coupling between the particles.

FIG. 6 shows in plane and out of plane coercivities of 3 FePt nanoparticle samples that were measured with a Kerr magnetometer. Coercivities of 1800 Oe, 2000 Oe and 5000 Oe for the three different annealing conditions were found as indicated at the top of FIG. 6. There is little difference between the in-plane and the out-of-plane coercivities, indicating that a 3D-random orientation of the magnetic axes exists.

Figure 7:
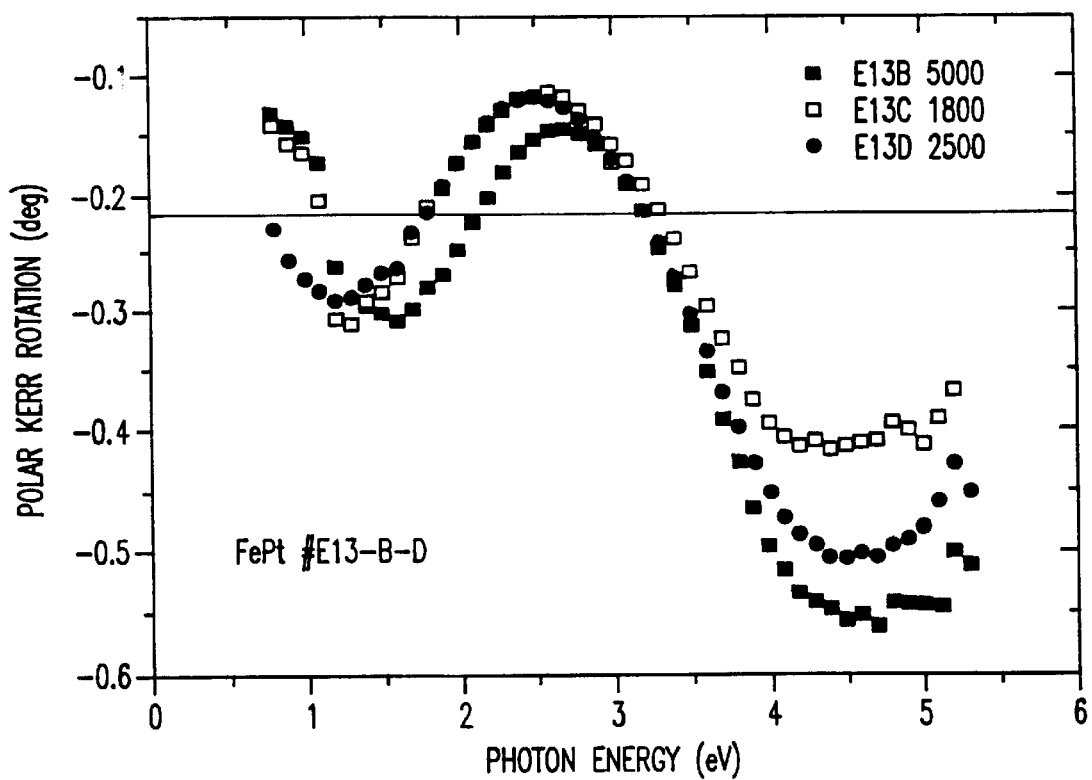
FIG. 7 shows magneto-optical Kerr spectra taken in the energy range 0.8–5.3 eV where characteristic shifts in peak positions and changes in the Kerr angle are observed, consistent with the higher ordering for the higher coercivity sample.

Further evidence for the presence of chemical ordering and the formation of the high anisotropy FePt $L1_0$ phase is gained from magneto-optical Kerr spectroscopy measurements, shown in FIG. 7. Magneto-optical Kerr spectroscopy measurements have been intensively used in the past to establish magneto-structural correlations. The observed shift in the Kerr peak to higher energies upon further annealing is consistent with earlier work on thin FePt films [D. Weller, *Spin Orbit Influenced Spectroscopies*, 1995].

Figure 8:
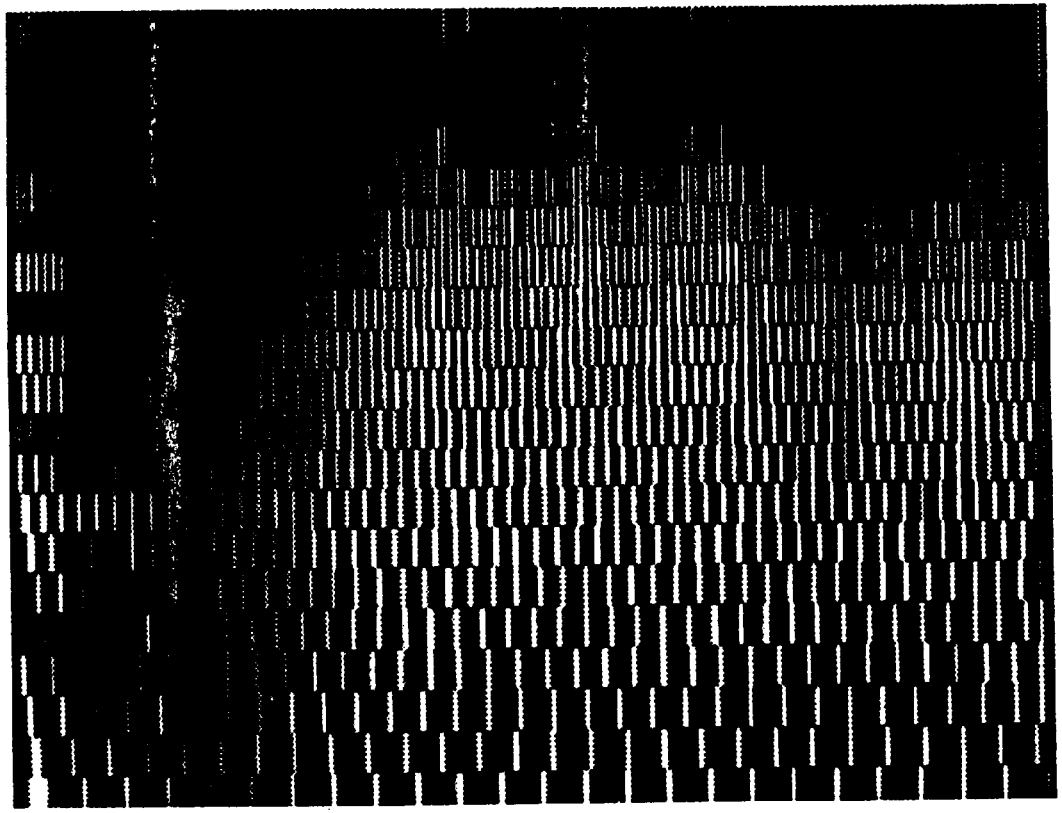
FIG. 8 shows an actual write/read experiment on the 1800 Oe (30 min 600° C.) sample using a static write/read test apparatus.

FIG. 8 shows an actual write/read experiment on the 1800 Oe (30 min 600° C.) FePt sample using a static write/read test apparatus. More specifically, FIG. 8 shows a two-dimensional stray field image taken with the MR element of a standard record head. Twenty parallel 100 $\mu$m long tracks of written bit transitions varying in linear density from 500 to 5000 flux changes per mm were written and imaged with the record head in physical contact with the sample, indicating the abrasion resistance of these nanoparticle films. The same apparatus has been used to assess the thermal stability of the sample, which is characterized by the ratio of reversal barrier height and thermal energy $E_B/k_BT$.

Figure 9:
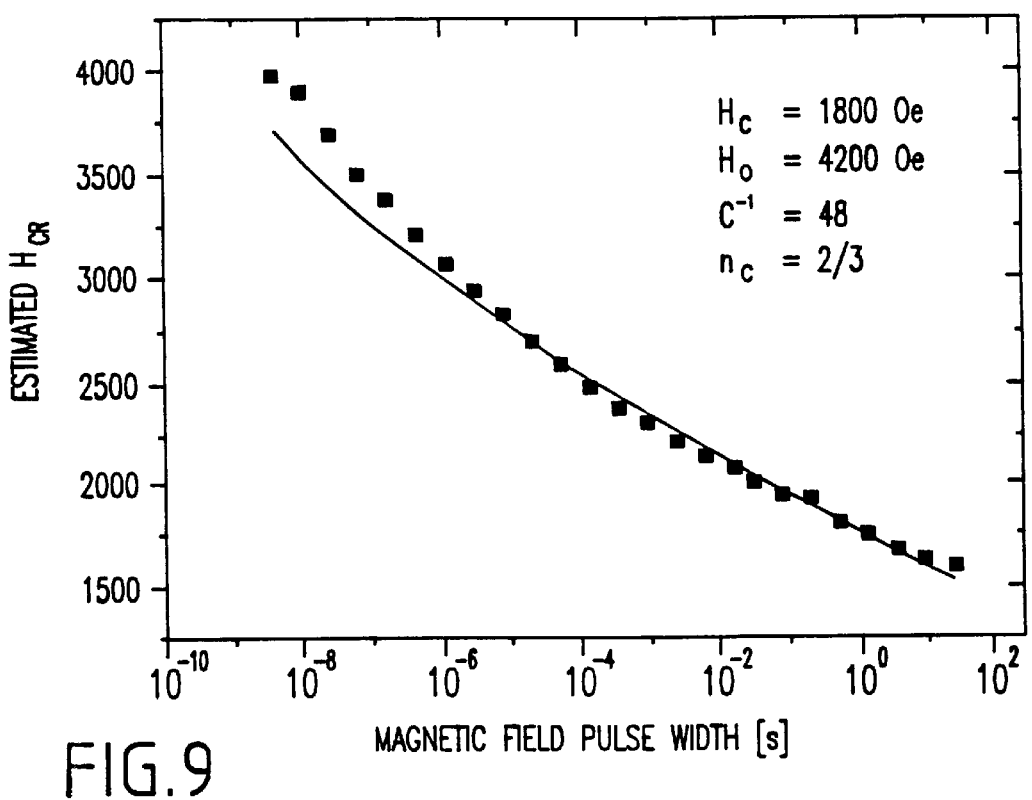
FIG. 9 shows a so called dynamic coercivity measurement, from which a thermal stability ratio of $C^{-1} = E_B/k_BT = 48$ has been extracted.

FIG. 9 shows a so called dynamic coercivity measurement, from which this number can be extracted as a slope parameter $$C^{-1}, H_{CR}=H_0(1-\{C \ln (t_p f_0/\ln 2)\}^{2/3}).$$

$H_0$ is an intrinsic switching field reached at short write field pulses $t_p=1$ ns and $C^{-1}=E_B/k_BT$. We find $C^{-1}=48$, which indicates sufficient thermal stability for this FePt sample. Improved stability occurs in the higher coercivity samples. This is just a demonstration that these kinds of measurements can be carried out on the present FePt nanoparticle samples.

Figure 10:
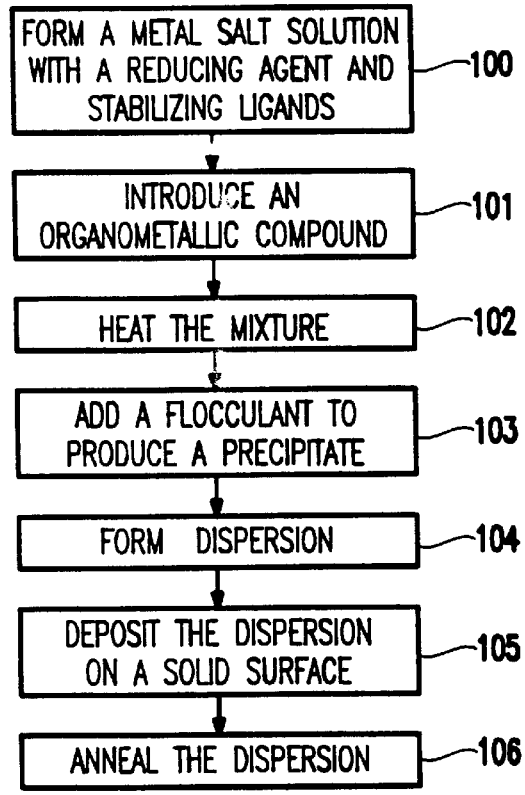
FIG. 10 is a flow diagram showing the process of forming the magnetic alloy nanoparticle film.

The process of forming the magnetic alloy nanoparticle film includes forming a metal salt solution with a reducing agent and stabilizing ligands 100, introducing an organometallic compound 101, heating the mixture 102, adding a flocculent to produce a precipitate 103, forming a dispersion 104, depositing the dispersion on a solid surface 105, and annealing the dispersion 106, as shown in FIG. 10.

Thus, the deposition of the alkane dispersion of FePt alloy particles, followed by the annealing results in the formation of a shiny FePt nanocrystalline thin film with coercivity ranging from 500 Oe to 6500 Oe.

The following examples demonstrate some of the specific uses of the invention. The first example is for the synthesis of FePt particles. Platinum acetylacetonate/1,2-hexadecanediol/dioctylether in the ratio of 1.0 mmol:1.5 mmol/40 mL were mixed in a glass vessel under nitrogen and heated to 100° C. to give a yellow solution. Oleic acid (1 mmol) and oleylamine (1 mmol) were added and the mixing process was continued with $N_2$ flushing for 20 minutes. The $N_2$ flushing was stopped and the $N_2$ was adjusted to by-pass the reaction mixture slowly to insure full protection of the reaction product from oxidation. $Fe(CO)_5$ (2 mmol) was added and the mixture was heated to reflux (293° C.) in a period of about 14 minutes. The refluxing was continued for 30 minutes. The heat source was removed and the black reaction mixture was cooled to room temperature. Ethanol was then added. The black product was precipitated and separated by centrifugation. Yellow-brown supernatant was discarded and the black product was dispersed in hexane in the presence of oleic acid and 1-octadecylamine. The product was precipitated out by adding ethanol and centrifugation. The precipitate was once again dispersed in hexane in the presence of only 1-octadecylamine. Any unsolved precipitation was removed by centrifugation. The particle materials were precipitated out by adding ethanol and centrifugation, re-dispersed in hexane, and stored under $N_2$. Although the product can be easily handled without any inert gas protection, it is preferable to store the hexane dispersion under $N_2$ for long term protection.

A second example involved the synthesis of nanocrystalline thin films. Hexane dispersion of FePt nanoparticles (0.5 mg/mL) was deposited on a $SiO_2$/Si substrate. The solvent hexane evaporated at room temperature. The thickness of particle thin film can be easily controlled by controlling the volume of hexane dispersion deposited on the solid surface. The as-deposited thin film was transferred to a $N_2$ glove box with $0_2$ content lower than 10 ppm and annealed in a oven. The temperature was raised to a desired level (e.g., 550° C.) from room temperature in a course of around 13 minutes and kept at that temperature level. After a certain time (e.g., 30 minutes), the thin film sample was taken out of the oven and cooled down to room temperature. The film produced was stable towards oxidation and could be used for further measurement. The roughness of the deposited films has been investigated by atomic force microscopy (AFM), as shown in FIG. 4, and RMS roughness values of approximately 1 nm have been achieved over areas of 3×3 $\mu$m.

Another example involves the magnetic domain structure of the nanocrystalline thin films. The magnetic domain structures which evolve in the as-deposited films have been investigated by magnetic force microscopy (MFM) and it has been found that there is a stable magnetic domain structure with length scales of order of hundreds of nanometers, as shown in FIG. 4(b). This long range ordering is attributed to the dipolar coupling between the particles.

High density recording media uniform particles with an average diameter of 8–10 nm or less and a high Hc of 2500 Oe will soon be required. The invention's synthetic method leads to nearly monodisperse particle thin films with controllable coercivity, providing a viable approach to such ultra-high density recording media.

This alloy may also have great potential for use as magnetic bias films of magneto-resistive elements and magnetic tips for magnetic force microscopy. Specifically, non-volatile magnetic memory devices and magneto-resistive sensory for magnetic recording systems "Read Head".

While the invention has been described in terms of preferred embodiments, those skilled in the art will recognize that the invention can be practiced with modification within the spirit and scope of the appended claims.

What is claimed is:

1. A method of forming a magnetic alloy nanoparticle film, comprising:

forming a metal salt solution with a reducing agent and stabilizing ligands;

introducing an organometallic compound into said metal salt solution to form a mixture;

heating said mixture to a temperature between 260° C. and 300° C.;

adding a flocculent to cause said magnetic alloy nanoparticles to produce a precipitate out of said mixture without permanent agglomeration;

forming a dispersion with said precipitate;

depositing said dispersion on a solid surface;

annealing said dispersion in an inert atmosphere at temperature up to 650° C.; and cooling said dispersion under an inert atmosphere.

2. The method in claim 1, wherein said dispersion comprises one of:

an alkane dispersion, including pentane, hexane, heptane, octane and dodecane;

a chlorinated solvent dispersion, including dichloromethane and chloroform; and an aromatic solvent dispersion, including benzene, toluene and xylene.

3. The method in claim 1, wherein said dispersion comprises an $RNH_2$, where R comprises an alkyl or alkenyl chain of C12 or longer, formed by the addition of alcohol.

4. The method in claim 1, wherein said inert atmosphere comprises one of $N_2$ or Ar.

5. The method in claim 1, wherein said annealing temperature is between 400° C. and 650° C.

6. The method in claim 1, wherein said annealing forms a layer of amorphous carbon around particles in said precipitate.

7. The method in claim 1, wherein said organometallic compound includes a solvent comprising one of phenyl ether and dioctyl ether.

8. The method in claim 1, wherein the reducing agent comprises a long chain diol.

9. The method in claim 8, wherein said long chain diol comprises one of 1,2-hexadecanediol, 1,2-dodecanediol and 1,2-octanediol.

10. The method in claim 1, wherein said stabilizing ligands include RCOOH and $RNH_2$, where R comprises an alkyl, alkenyl hydrocarbon chain of C6 length or longer.

11. The method in claim 1, wherein said flocculent comprises an alcohol including one of methanol, ethanol, propanol and butanol.

12. The method in claim 1, wherein said metal salt solution comprises one of Pt salt, $Pt(CH_3COCHCOCH_3)_2$, $Pt(CF_3COCHCOCF_3)_2$, Tetrakis (triphenylphosphine) Platinum(O), or Pt $(triphenylphosphine)_{4-x}(CO)_x$ where x is at least 1 and no greater than 3.

13. The method in claim 1, wherein said organometallic compound comprises one of $Fe(CO)_5$, $Co_2(CO)_8$, $Co_4(CO)_{12}$, $Fe_2(CO)_9$, $Fe_3(CO)_{12}$, $Fe(CNR)_5$, and (Diene)$Fe(CO)_5$.

* * * * *